US009059602B2

(12) United States Patent
    Tsuchiya

(10) Patent No.: US 9,059,602 B2
(45) Date of Patent: Jun. 16, 2015

(54) BATTERY CHARGER FOR ELECTRIC VEHICLE, AND RESCUE VEHICLE

(75) Inventor: Hisatoshi Tsuchiya, Numazu (JP)

(73) Assignees: TOYODENSAN CO., LTD., Numazu-shi (JP); MIWA TIRE CO., LTD., Kyoto (JP)

( * ) Notice: Subject to any disclaimer, the term of this patent is extended or adjusted under 35 U.S.C. 154(b) by 541 days.

(21) Appl. No.: 13/554,405

(22) Filed: Jul. 20, 2012

(65) Prior Publication Data

US 2013/0043838 A1    Feb. 21, 2013

(30) Foreign Application Priority Data

Jul. 22, 2011    (JP) ................. 2011-160795

(51) Int. Cl.
| H02J 7/14 | (2006.01) |
| H02J 7/16 | (2006.01) |
| H01M 10/46 | (2006.01) |
| H02P 9/48 | (2006.01) |

(Continued)

(52) U.S. Cl.
CPC .............. *H02J 7/16* (2013.01); *B60L 11/1809* (2013.01); *H02J 7/025* (2013.01); *B60L 11/1848* (2013.01); *B60L 11/1812* (2013.01); *H01M 10/46* (2013.01); *H02P 9/48* (2013.01); *Y02T 10/7005* (2013.01)

(58) Field of Classification Search
USPC ......... 320/109, 104, 152, 107, 111, 132, 151, 320/153, 162, 163; 324/426; 180/65.29, 180/65.1, 27.9, 65.21, 65, 27
See application file for complete search history.

(56) References Cited

U.S. PATENT DOCUMENTS

| 8,245,802 B2 * | 8/2012 | Inoue et al. ................. 180/65.28 |
| 2002/0115516 A1 * | 8/2002 | Kawabata et al. ................. 475/5 |
| 2004/0227348 A1 * | 11/2004 | Wakitani et al. ................. 290/31 |

(Continued)

FOREIGN PATENT DOCUMENTS

| EP | 2523301 A1 | 11/2012 |
| JP | 11-164411 A | 6/1999 |

(Continued)

OTHER PUBLICATIONS

Battery Charging Services for Electric Vehicles under Electricity Business Act, Agency for Natural Resource and Energy, Electricity•Gas Division, Nov. 2010, [online], <URL, http://www.meti.go.jp/committee/sougouenergy/denkijigyou/seido_kankyou/001_06_00.pdf>, 6 pages total.

*Primary Examiner* — Edward Tso
*Assistant Examiner* — Alexis A Boateng
(74) *Attorney, Agent, or Firm* — Sughrue Mion, PLLC

(57) ABSTRACT

A generator driven by the driving force of a vehicle traction engine has permanent magnets and electromagnets arranged in tandem on a rotor, the magnetic field of the permanent magnet and the magnetic field of the electromagnet act independently on stator coils of a stator, forming a high-power unit controlled by a generator control unit that, when the output of the generator is lower than a prescribed value, flows forward current through the field coils to generate a magnetic field having the same orientation as the magnetic field due to the permanent magnet, and when the output of the generator is higher than a prescribed value, passes a reverse current through the field coils that generates a magnetic field having an opposite orientation to that of the magnetic field due to the permanent magnet, forming an alternating current having a prescribed value. The alternating current output is rectified.

20 Claims, 9 Drawing Sheets

(51) Int. Cl.
*B60L 11/18* (2006.01)
*H02J 7/02* (2006.01)

(56) References Cited

U.S. PATENT DOCUMENTS

2010/0019569 A1* 1/2010 Izumi et al. .................... 307/9.1
2010/0045239 A1* 2/2010 Oki .............................. 320/132
2011/0115318 A1* 5/2011 Hashimoto et al. ............. 310/78
2011/0298424 A1* 12/2011 Yamauchi et al. ............. 320/118

FOREIGN PATENT DOCUMENTS

| JP | 11243674 A | 9/1999 |
| JP | 2010-200393 A | 9/2010 |
| WO | 2011083873 A1 | 7/2011 |

* cited by examiner

FIG. 4
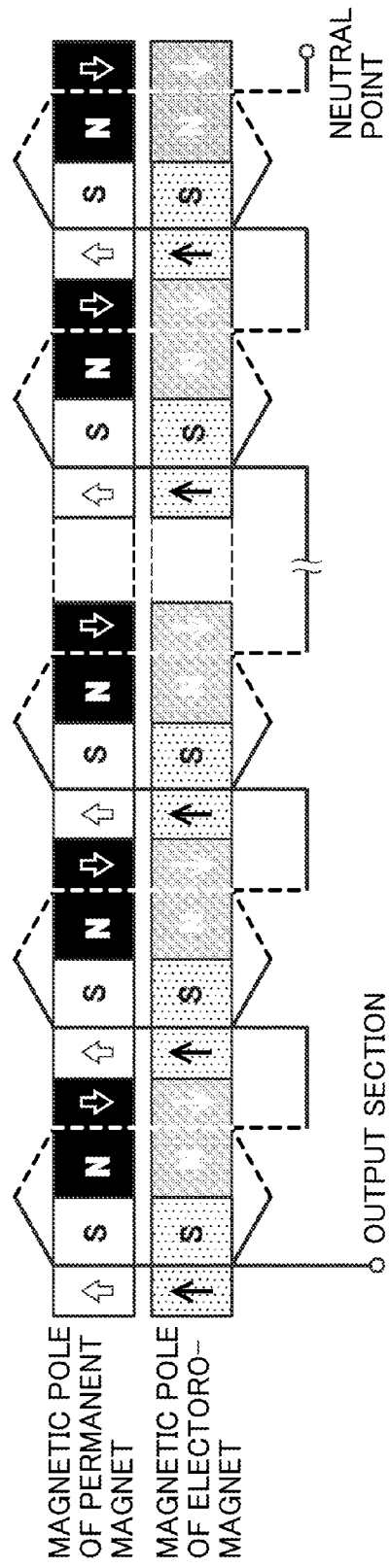
(a) OPEN CIRCUIT VOLTAGE DURING VOLTAGE INCREASE CONTROL
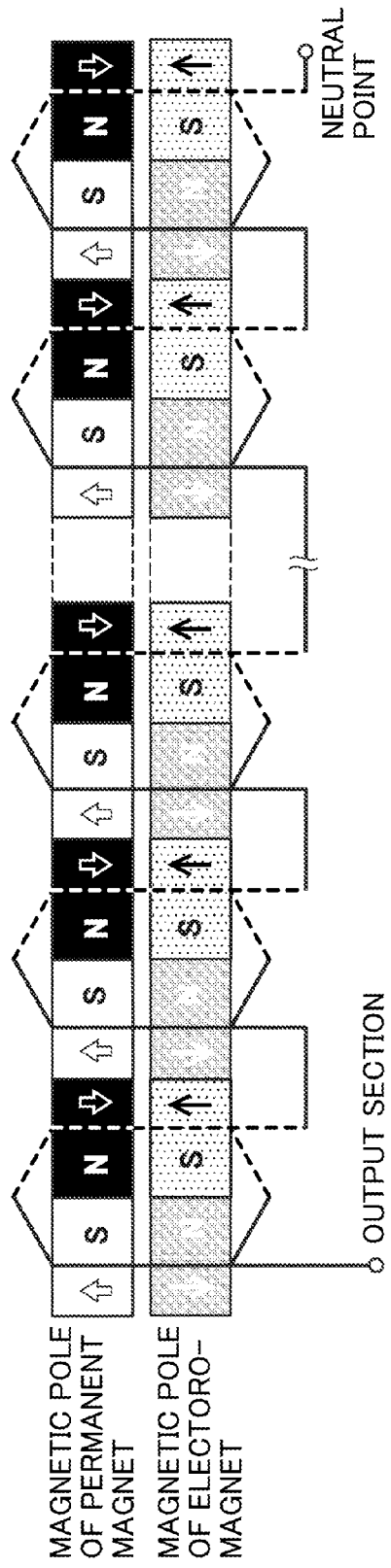
(b) OPEN CIRCUIT VOLTAGE DURING VOLTAGE DECREASE CONTROL

BATTERY CHARGER FOR ELECTRIC VEHICLE, AND RESCUE VEHICLE

FIELD OF THE INVENTION

This invention relates to a battery charger for an electric vehicle that can charge an electric vehicle battery by generating electricity by using the driving force of the vehicle's engine to drive a rotor, and to a rescue vehicle equipped with the battery charger.

BACKGROUND ART

Recent years have seen the spread of electric vehicles that run on electric motors powered by electricity from a charged secondary battery, and quick-charge stands for electric vehicles are being provided in various places where electric vehicles can make a stop to charge their batteries, increasing the driving range of the electric vehicles. However, there are still not enough quick-charge stands, so electric vehicles can run out of battery power before reaching a charge stand. One idea in such cases for rescuing an electric vehicle that has run out of battery power is to restore the electricity supply function that powers the motor of the electric vehicle, much like replenishing a gasoline vehicle that has run out of gasoline.

For example, technology has been proposed in which an electric vehicle is equipped with a separate secondary battery that can quickly charge the main battery. Thus, whenever the vehicle operating condition deteriorates or the vehicle can't be driven due to a decline in the main battery voltage, the vehicle can be restored to a drivable condition by using the secondary battery to recharge the main battery (see for example Patent Document 1).

Another technology that has been proposed is one in which an auxiliary battery that can supply electricity to the battery mounted on the electric vehicle is carried on a wheeled barrow that can be coupled to the rear of the vehicle, enabling the main battery to be charged by the auxiliary battery while the vehicle is being driven to the nearest charge station (see for example Patent Document 2).

DESCRIPTION OF THE PRIOR ART

[Patent Document 1] Unexamined Patent Application Publication Hei 11-164411
[Patent Document 2] Examined Patent Application Publication 2010-200393

DISCLOSURE OF THE INVENTION

However, in order to restore an electric vehicle with a flat battery to a drivable state using the main battery charging method described in Patent Document 1, a secondary battery having a higher voltage than the vehicle's main battery has to be installed beforehand in the vehicle and fully charged. When the cost of doing this and the space required are taken into consideration, it is more practical to use a large-capacity main battery to increase the distance the vehicle can be driven, and the complexity of charging the main and secondary batteries is also burdensome for the user.

Also, while the method of Patent Document 2 in which an auxiliary battery is coupled to the vehicle makes it possible for the driver to fetch an auxiliary battery if the round trip between where the electric vehicle is parked and a charge station equipped with auxiliary batteries is a relatively short walk, if the distance to the charge station is too far to walk, it will come down to loading an auxiliary battery onto a rescue vehicle that has a loading platform and bringing the auxiliary battery to where the vehicle is parked. Moreover, the rescue vehicle has to accompany the electric vehicle with the auxiliary battery to the nearest charge station to collect the used auxiliary battery, making rescue vehicle operations inefficient.

A rescue method that is more practical than the above technologies for restoring an electrical supply to an electric vehicle is to use a truck equipped with a large motor generator and charger which are used in quick-charge stands. The truck proceeds to where the electric vehicle with the flat battery is and three-phase AC power generated by the motor generator is supplied to the charger, which receives charge data from the electric vehicle, converts the electricity to the DC voltage required for the charging, and performs on-the-spot quick charging of the vehicle.

However, quick-charging an electric vehicle requires a large current of several tens of kilowatts, so the motor generator and charger are also large, making the vehicle correspondingly large, with a weight that can reach several tons. Moreover, in addition to rescuing electric vehicles with flat batteries, rescue vehicles may be called on to handle other vehicle problems and are therefore equipped for adjusting tires and the like. The body of a rescue body must therefore be large and spacious enough to accommodate the motor generator and charger as well as the other equipment, which further increases the overall size. It can be difficult for such a large rescue vehicle to make its way through hilly regions or along narrow urban streets to a waiting electric vehicle with a flat battery. Thus, even if a rescue vehicle is manufactured and equipped with a large motor generator and charger to enable it to respond to electric vehicles with flat batteries, it may not necessarily be able to carry out that function to the full.

There are vehicles equipped with an on-board generator in which the vehicle traction engine of the vehicle is used as a driving source to operate the generator to obtain the desired electric power. If such an on-board generator could be used to charge the battery of an electric vehicle, it would be possible to make the vehicle body smaller than one which has to accommodate a large motor generator and charger. However, it would take a long time (for example, 7 to 15 hours for a full charge) to charge an electric vehicle battery from an AC power source with a commercial frequency produced by an on-board generator intended for powering household electric appliances, etc. It could for example take several hours just to provide enough of a charge to drive to the nearest charge stand, making it impractical for rescue operations.

On the other hand, while a permanent magnet generator can be small and light and provide high output, a drawback when converted to on-board application is that as the permanent magnet has a fixed field strength, the generator output fluctuates with fluctuations in engine speed and load, so the generator is unstable and unable to maintain a constant output voltage. Although the output of a permanent magnet generator that varies according to engine speed and connected load can be converted to a desired voltage by a DC/DC converter, which stabilizes the generator output, heat generated by the DC/DC converter operation becomes a problem, and increasing the heat dissipation performance of a DC/DC converter also increases the size of the converter, so it becomes difficult to make the generator sufficiently light and small for on-board applications.

An object of the invention is to provide a small, light battery charger for an electric vehicle that can be readily put on board a non-large rescue vehicle, and a rescue vehicle equipped with the battery charger.

To solve the above problem, the invention of claim 1 is a battery charger for an electric vehicle provided with a generator function unit including a generator and a generator control unit; the generator comprising; a rotor driven by a vehicle engine, on which a permanent magnet that generates a fixed magnetic field with a constant intensity and an electromagnet that generates a magnetic field with an intensity in accordance with a supply current are disposed so as not to interfere the two magnetic fields; and a stator fitted with stator coils, on which rotating magnetic fields generated by the permanent magnet and electromagnet of said rotor act simultaneously; the generator control unit comprising; rectifier means that converts alternating current produced in the stator coils of the stator to direct current; generator voltage detection means that detects a voltage of a direct current rectified by said rectifier means, and generator control means, when a generator voltage detected by the generator voltage detection means is lower than a predetermined prescribed value, carrying out voltage increase control by supplying the electromagnet field coil with a forward current that produces in the electromagnet magnetic flux having a same orientation as magnetic flux of the permanent magnet, and stopping the forward current when the generator voltage detected by the generator voltage detection means reaches a default value, and when the generator voltage detected by the generator voltage detection means is higher than a predetermined prescribed value, carrying out voltage decrease control by supplying the electromagnet field coil with a reverse current that produces in the electromagnet magnetic flux having a reverse orientation to that of the magnetic flux of the permanent magnet, and stops the reverse current when the generator voltage detected by the generator voltage detection means reaches the default value; and the generator function unit being connected by feeder line to the electric vehicle to be charged for obtaining charge data and charging the electric vehicle battery by supplying electric power maintained at a charge voltage and charging current that form an appropriate charging environment in accordance with the charge data.

The invention according to claim 2 is the battery charger for an electric vehicle according to claim 1, wherein the generator function unit constantly monitors charge voltage and charge current going to the electric vehicle battery during charging operations, and immediately stops supplying electricity to the battery if an abnormal condition arises in which a monitored value exceeds an upper-limit charge voltage or charge current predetermined as an appropriate charging environment.

The invention according to claim 3 is a battery charger for the electric vehicle according to claim 1 or 2, wherein the generator control unit carries out a prior calculation of the time required to fully charge the electric vehicle and stops the charging operation when said time from charging operation initiation has elapsed.

The invention according to claim 4 is a battery charger for the electric vehicle according to any of claims 1 to 3 that includes an auxiliary battery that can be charged using power generated by said generator.

The invention according to claim 5 is the battery charger for the electric vehicle according to claim 4, wherein the auxiliary battery can be charged from an external commercial power supply.

And, the invention according to claim 6 is a rescue vehicle equipped with the battery charger for an electric vehicle according to any of claims 1 to 5.

In accordance with claim 1, a battery charger for an electric vehicle provided with a generator function unit including a generator and a generator control unit; the generator comprising; a rotor driven by a vehicle engine, on which a permanent magnet that generates a fixed magnetic field with a constant intensity and an electromagnet that generates a magnetic field with an intensity in accordance with a supply current are disposed so as not to interfere the two magnetic fields; and a stator fitted with stator coils, on which rotating magnetic fields generated by the permanent magnet and electromagnet of said rotor act simultaneously; the generator control unit comprising; rectifier means that converts alternating current produced in the stator coils of the stator to direct current; generator voltage detection means that detects a voltage of a direct current rectified by said rectifier means, and generator control means, when a generator voltage detected by the generator voltage detection means is lower than a predetermined prescribed value, carrying out voltage increase control by supplying the electromagnet field coil with a forward current that produces in the electromagnet magnetic flux having a same orientation as magnetic flux of the permanent magnet, and stopping the forward current when the generator voltage detected by the generator voltage detection means reaches a default value, and when the generator voltage detected by the generator voltage detection means is higher than a predetermined prescribed value, carrying out voltage decrease control by supplying the electromagnet field coil with a reverse current that produces in the electromagnet magnetic flux having a reverse orientation to that of the magnetic flux of the permanent magnet, and stops the reverse current when the generator voltage detected by the generator voltage detection means reaches the default value; and the generator function unit being connected by feeder line to the electric vehicle to be charged for obtaining charge data and charging the electric vehicle battery by supplying electric power maintained at a charge voltage and charging current that form an appropriate charging environment in accordance with the charge data.

With the battery charger for an electric vehicle according to claim 2, the generator function unit constantly monitors charge voltage and charge current going to the electric vehicle battery during charging operations, and immediately stops supplying electricity to the battery if an abnormal condition arises in which a monitored value exceeds an upper-limit charge voltage or charge current predetermined as an appropriate charging environment, preventing accidents that could damage the battery.

In accordance with the battery charger for an electric vehicle according to claim 3, the generator control unit carries out a prior calculation of the time required to fully charge the electric vehicle and stops the charging operation when said time from charging operation initiation has elapsed. So rather than let the charging continue until the vehicle is fully charged, charging is brief, providing just enough of a charge to drive the vehicle to a charge station.

The battery charger for an electric vehicle according to claim 4 includes an auxiliary battery that can be charged using power produced by the generator. The generator and auxiliary battery can be used together, providing large-capacity power that can be used for quick-charging.

With the battery charger for an electric vehicle according to claim 5, the auxiliary battery can be charged from an external commercial power supply, so it can be charged at a desired time without using the generator. This makes it possible to use cheap nighttime power to charge the auxiliary battery.

The rescue vehicle of claim 6 can be equipped with the battery charger described in any of the claims 1 to 5, providing a vehicle configuration that can traverse hilly regions and narrow urban roads, and is also furnished with large-capacity power supply capabilities suitable for charging electric vehicle batteries.

BRIEF DESCRIPTION OF THE DRAWINGS

[FIG. 4] An explanatory diagram of the voltage increase control and voltage decrease control by the generator control means.

BEST MODE FOR CARRYING OUT THE INVENTION

An embodiment of the rescue vehicle on which the battery charger for an electric vehicle is mounted in accordance with the present invention will now be described in detail with reference to the drawings.

Figure 1:
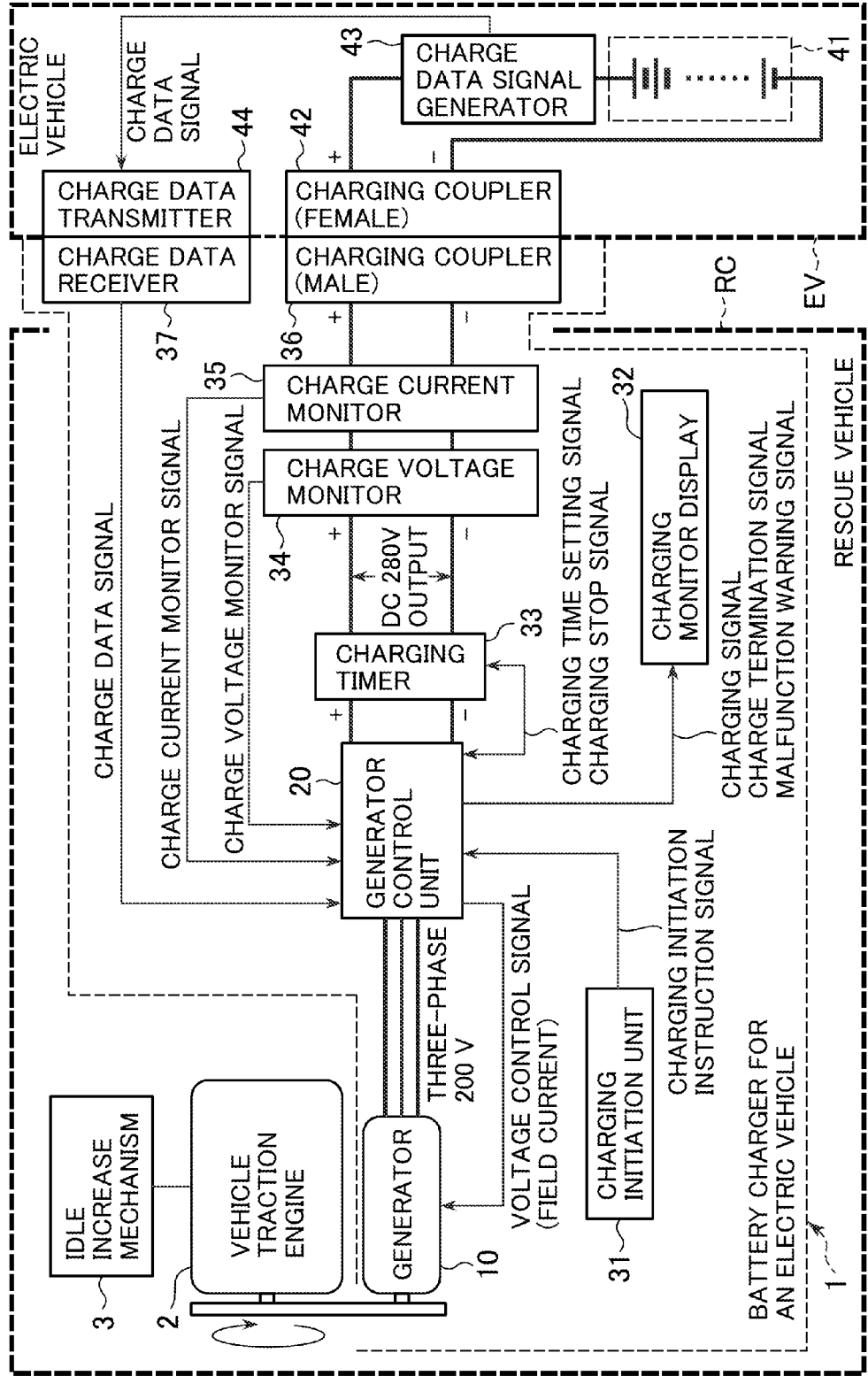
[FIG. 1] A block diagram schematically illustrating a rescue vehicle on which the battery charger for an electric vehicle is mounted, according to a first embodiment of the invention.

As a first embodiment, FIG. 1 shows the configuration during quick charging of an electric vehicle EV by a battery charger 1 mounted on a rescue vehicle RC. A generator 10 driven by a vehicle traction engine 2 of the rescue vehicle RC and a generator control unit 20 that rectifies a 200 V three-phase alternating current output by the generator 10 comprise a generator function unit of the battery charger 1 used as the power source for charging the electric vehicle EV with 280 V of direct current produced by the generator function unit.

The rotor of the generator 10 is driven by the driving force of the vehicle traction engine 2 via a power transmission means such as a belt. The voltage control that maintains the output of the generator 10 at 200 V of three-phase alternating current is carried out by a field current from the generator control unit 20 that flows through a field winding provided on the generator rotor. An idle increase mechanism 3 is provided to suitably control the speed of the vehicle traction engine 2. Operating functions of the generator function unit are described in more detail later.

The generation of the electric power for charging by the generator function unit is, for example, controlled by a user operating a charging initiation unit 31, which inputs a charging initiation signal to the generator control unit 20 while the vehicle traction engine 2 is driven, which applies field control to the generator 10 (by outputting a voltage control signal), to obtain a stable DC 280 V output. During the operation, the generator control unit 20 outputs charging, charging completed and malfunction warning signals to a charging monitor display 32 which displays the operating status corresponding to the input signals. A user can use the charging monitor display 32 to confirm the operating status of the battery charger 1 and any malfunction that may occur.

The feed line that supplies generated power from the generator control unit 20 is provided with a charging timer 33, charge voltage monitor 34 and charge current monitor 35. The monitoring signals from the charge voltage monitor 34 and charge current monitor 35 are sent to the generator control unit 20, which enables the generator control unit 20 to maintain a grasp of system status during charging. The time until charging stops can be monitored by the input of a charging time setting signal from the generator control unit 20 to the charging timer 33, and when the charging time is up, a charging stop signal is immediately sent to the generator control unit 20 that cuts off the feed line. There is no particular limitation on the method of calculating the time setting for the charging timer 33. A configuration may be used that calculates the time needed for charging from the current remaining capacity of electric vehicle EV battery 41 to a set ratio, or a configuration that uses external input means to input the distance from the electric vehicle EV to the charge station to calculate the charging time required for the EV to be able to drive that distance.

A quick-charge feed port provided as standard is used to charge the electric vehicle EV battery 41. The EV feed port of electric vehicle EV has a charging coupler 42 for DC input that enables DC 280 V charging of the battery 41 (having a rated voltage of 200 V, for example) by connecting the charging cable of the battery charger 1 to a charging coupler 36. During charging, data signals on the charging status of the battery 41 from a charge data signal generator 43 are input to the generator control unit 20 via a charge data transmitter 44 and charge data receiver 37 on the battery charger 1 side to prevent overvoltage or overcurrent.

The charge data can utilize CAN (Controller Area Network), a communication protocol that is becoming widespread for communicating data and control of the various electronic units that are mounted on electric vehicles. Also, as the rated capacity of the EV battery 41 is not standardized, the generator control unit 20 can be configured to carry out charging at the proper voltage in accordance with the charge capacity of the battery 41 received via CAN communications.

Figure 2:
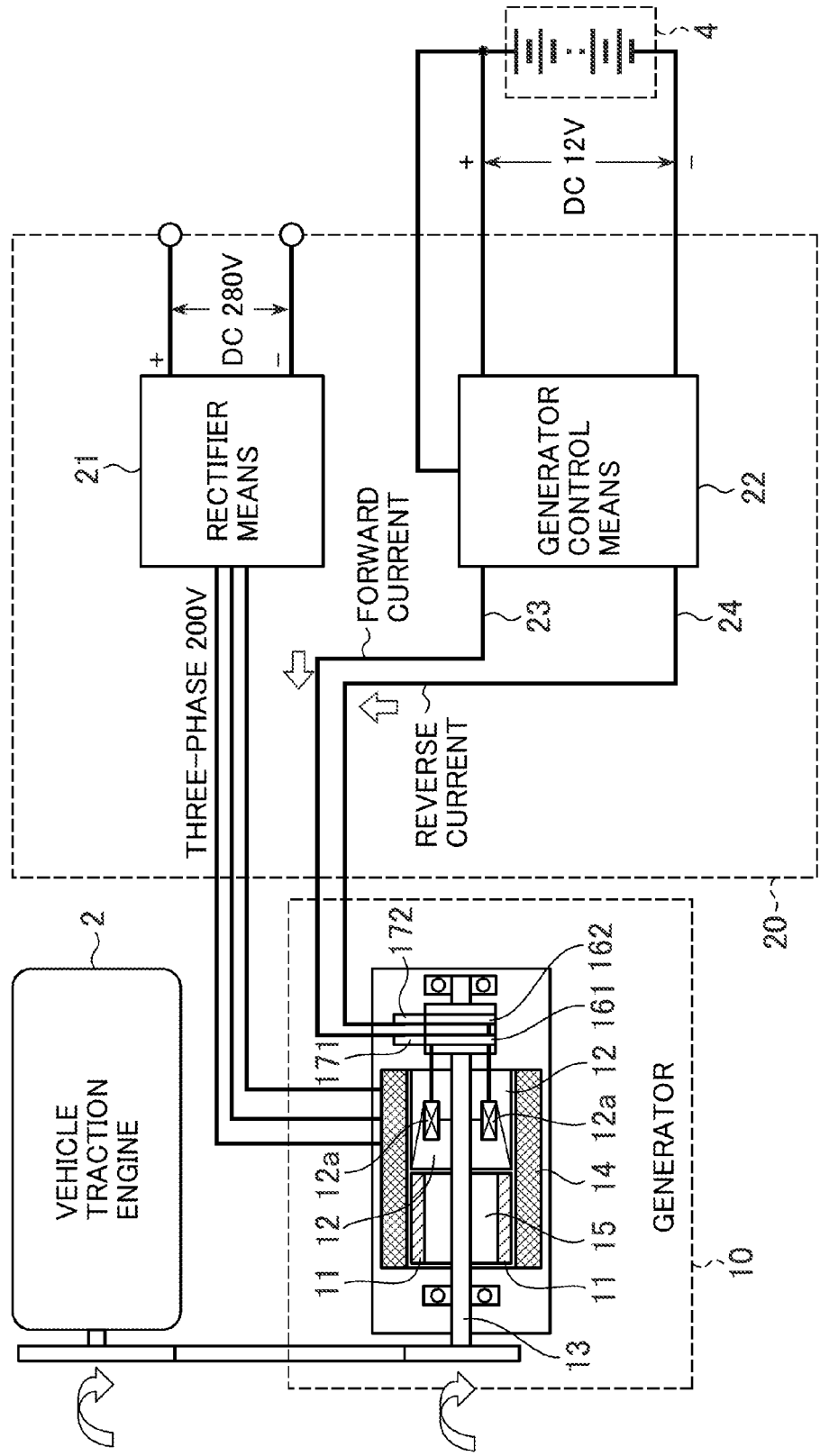
[FIG. 2] A block diagram schematically illustrating the generator function unit in the battery charger for an electric vehicle according to the invention.

FIG. 2 shows the configuration of a generator function unit comprised of the generator 10 operated by the driving force of the vehicle traction engine 2 and the generator control unit 20. For simplicity, explanation of the charge control functions of the generator control unit 20 is omitted. The explanation will be made with respect to rectifier means 21 that converts the three-phase alternating current output (200 V, for example) of the generator 10 to direct current (approximately 280 V), and generator control means 22 that detects the output voltage of the rectifier means 21 and controls field current to the generator 10. A vehicle battery 4 (12 V DC) can be used to provide the power needed for the operation of the generator control means 22, and can also be used as the field current source used for controlling the generator 10.

Figure 3:
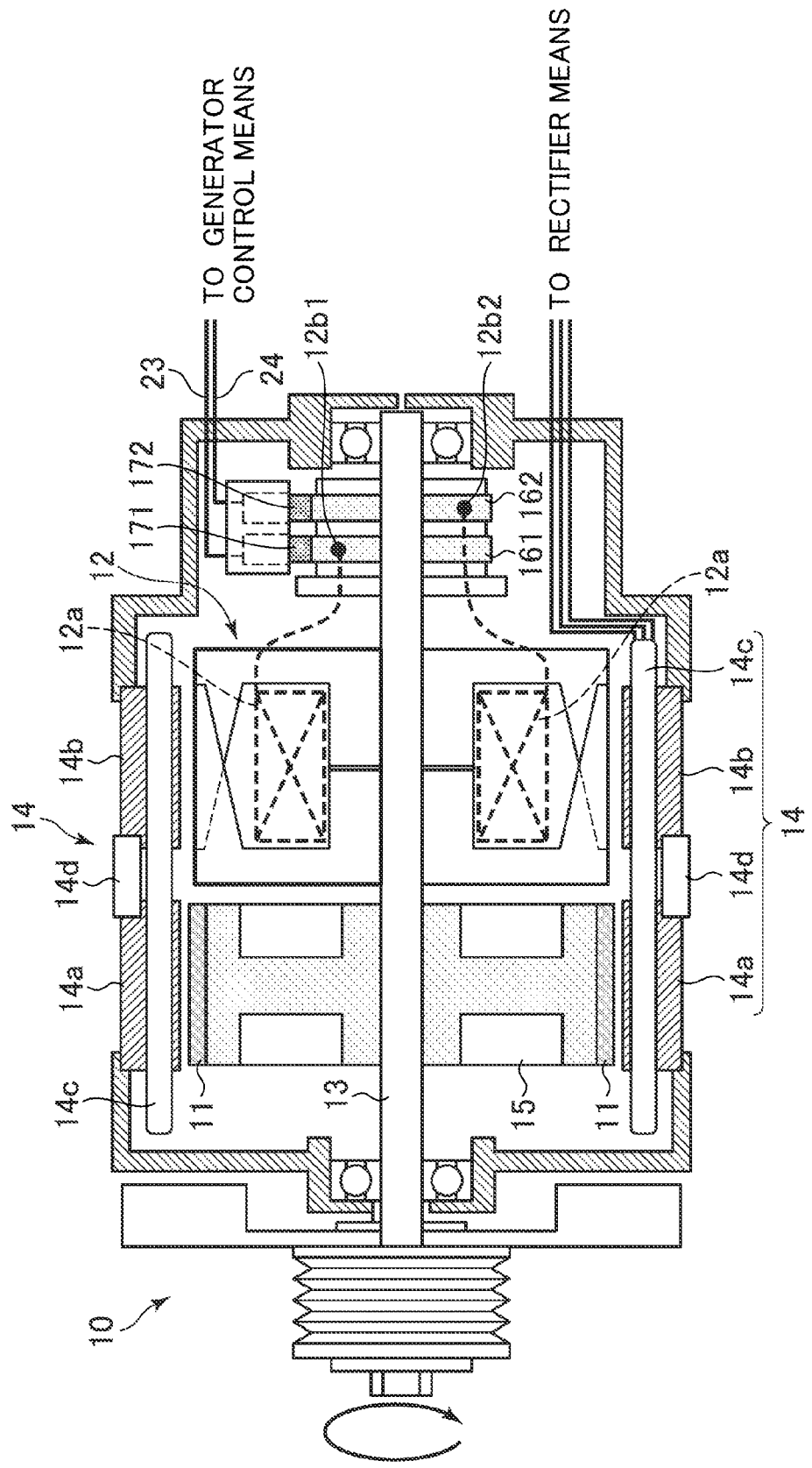
[FIG. 3] A schematically longitudinal sectional structural diagram of the generator.

As shown in FIG. 3, a permanent magnet 11 that generates a fixed magnetic field of a constant intensity and an electromagnet 12 that is capable of generating a magnetic field of an intensity in accordance with the supply current are arranged in tandem at a rotor 13 so the two magnetic fields do not interfere, to thereby have the magnetic fields acting independently on the stator 14 disposed on the circumference thereof. That is, in the generator 10, the rotating magnetic field generated by the permanent magnet 11 and the rotating magnetic field generated by the electromagnet 12 act simultaneously on the stator 14.

The permanent magnet 11 is constituted, for example, as 16 evenly spaced pieces disposed annularly on the circumferential surface of the yoke 15 attached to the rotor 13, with the magnetic polarity of adjacent permanent magnets 11 alternating, whereby 16 magnetic paths (8 pairs) are formed by flux flowing from permanent magnets 11 having an N polarity face in opposition to the stator 14 and entering the adjacent S polarity permanent magnet 11. If rare-earth samarium-cobalt magnets or neodymium magnets are used for the permanent magnets 11, the effect of armature reaction produced during load increases would be small due to the high coercive force of such magnets, making it possible to configure small, high-output generators.

The electromagnet 12 is constituted, for example, as 8 evenly spaced pieces disposed annularly in interdigital opposition to a claw pole portion, in a Lundell type arrangement in which 16 (8 pairs) of magnetic paths are formed from the outside N pole energized claw pole structure to the adjacent claw pole (outside is S pole energized) on the opposed side. Here, the positions of the 16 magnetic circuits formed by the claw pole portion of the electromagnets 12 are adjusted during attachment to the rotor 13 so that they line up axially with the 16 magnetic circuits formed by the permanent magnets 11.

In the configuration shown in the drawing, a first feed part 12b1 that is one end of the field coil 12a of the electromagnet 12 is connected to a first slip ring 161, and a second feed part 12b2 that is the other end of the field coil 12a is connected to a second slip ring 162, whereby electrical continuity is formed via a first brush 171 by a first feeder line 23 via a second brush 172 by a second feeder line 24 to receive the field current supplied from the generator control means.

That is, the orientation of the magnetic field generated when the field coil 12a is supplied with electricity so that the first feeder line 23 is the high voltage side (+ side) and the second feeder line 24 is the low voltage side (– side) (hereinbelow referred to as forward current), and the orientation of the magnetic field generated when the field coil 12a is supplied with electricity so that the first feeder line 23 is the low voltage side (– side) and the second feeder line 24 is the high voltage side (+ side) (hereinbelow referred to as reverse current) can be reversed.

Also, when forward current is supplied to the field coil 12a of electromagnet 12, the electromagnet 12 can be made to generate a magnetic field having the same orientation as a magnetic field generated by the permanent magnet 11, and when reverse current is supplied to the field coil 12a, the electromagnet 12 can be made to generate a magnetic field having the reverse orientation to a magnetic field generated by the permanent magnet 11.

There is no particular limitation on the method of supplying electricity from the generator control means 22 to the field coil 12a; an existing, publicly known brushless structure may be suitably used.

While in this configuration example, field current from the generator control means 22 to the generator 10 is supplied from the vehicle battery 4, this is not limitative, and direct current produced by using the rectifier means 21 to rectify the output of the generator 10 can be used as the field current. That is, a three-phase alternating current can be obtained from the generator 10 simply by using the driving force of the engine 2 to drive the rotor 13, and after the generating function of the generator 10 has been utilized, direct current obtained by the generation can be used as a field current source. The generator 10 can be controlled to obtain the required constant voltage direct current output, making it possible to operate the generator function unit without using the vehicle battery 4.

The rotor 13 disposed in the magnetic field produced by the permanent magnet 11 and electromagnet 12 is, for example, formed by a stator coil 14c wound on a stator core 14a for a permanent magnet provided in opposition to the permanent magnet 11, and a stator core 14b for an electromagnet provided in opposition to the electromagnet 12. The magnetic field produced by the permanent magnet 11 and the magnetic field produced by the electromagnet 12 act simultaneously on the stator coil 14c.

Therefore, when the rotation of the rotor 13 causes the rotating magnetic fields of the permanent magnet 11 and electromagnet 12 to act on the stator coil 14c (which is a three-phase winding, for example), three-phase alternating current is output from the generator 10.

In this configuration example, also, the stator core 14a and stator core 14b are constituted separately and combined into a single unit by a coupling ring 14d, but this is not limitative, and an integrated stator core may be provided and the magnetic fields of the permanent magnet 11 and electromagnet 12 made to act simultaneously on the same stator core.

In the generator 10 having the above configuration, the open circuit voltage generated in the stator coil 14c can be adjusted by the generator control means 22 controlling the field current to the electromagnet 12.

When for example the output of the generator 10 (in this embodiment, the voltage value of the direct current output from the rectifier means 21) is lower than the prescribed 280 V, a forward current flow takes place with respect to the field coil 12a which, as shown in FIG. 4 (a), brings the magnetic poles of the permanent magnet 11 disposed around the circumference of the yoke 15 into conformity with the magnetic poles of the claw pole portion of the electromagnet 12, so the magnetic field produced by the electromagnet 12 acts in the same direction as the magnetic field of the permanent magnet 11, enabling the open circuit voltage produced in the stator coil 14c to be raised. When the output of the generator 10 rises to 200 V and the output of the rectifier means 21 reaches the prescribed value of 280 V, the forward current stops. The control carried out by the generator control means 22 to raise the output of the generator 10 to the prescribed value is called the voltage increase control.

Conversely, when the output of the generator 10 is higher than the prescribed 200 V (when the output from the rectifier means 21 is higher than 280 V), a reverse current flow takes place with respect to the field coil 12a which, as shown in FIG. 4 (b), brings the magnetic poles of the permanent magnet 11 disposed around the circumference of the yoke 15 and the magnetic poles of the claw pole portion of the electromagnet 12 into reverse polarities, whereby the magnetic field produced by the electromagnet 12 cancels out the magnetic field of the permanent magnet 11, enabling the open circuit voltage produced in the stator coil 14c to be decreased. When the output of the rectifier means 21 reaches 280 V, the forward current is stopped. The control carried out by the generator control means 22 to decrease the output of the generator 10 to the prescribed value is called the voltage decrease control.

Thus, in accordance with the generator function unit configuration of this example, the generator output by the permanent magnet 11 can be directly made a constant voltage by the voltage increase control and voltage decrease control carried out by the generator control means 22, which makes it possible to realize a battery charger 1 that is light, compact and high-power.

The generator control means 22 will now be described in detail with reference to FIGS. 5 to 7.

The generator control means 22 has a charge voltage detection circuit 221 that detects the voltage of direct current rectified by the rectifier means 21. The generator voltage thus detected by the charge voltage detection circuit 221 is input to a voltage control circuit 222, which outputs to a polarity conversion control circuit 223 a voltage increase instruction when the generator voltage is lower than a prescribed value, a voltage decrease instruction when the voltage is higher than a prescribed value, and a stop instruction when the voltage is the prescribed value; the polarity conversion control circuit 223 controls the operation of a polarity conversion circuit 224.

In this configuration example, the charge voltage detection circuit 221, serving a charge voltage detecting means, that detects the voltage of the direct current rectified by the rectifier means 21 is provided inside the generator control means 22. However, an existing voltage sensor/current sensor may be used as the charge voltage detection means to supply the sensor output to the generator control means 22.

The polarity conversion circuit 224 is comprised of a first switching element 224a1, second switching element 224a2, third switching element 224a3, and fourth switching element 224a4. The four switching elements have identical characteristics and are configured to form an H bridge. The first switching element 224a1 is used to open and close the current path from the high voltage side (+ side) of the field current supply source to the first feed section 12b1 of the electromagnet 12, the second switching element 224a2 is used to open and close the current path from the high voltage side of the field current supply source to the second feed section 12b2 of the electromagnet 12, the third switching element 224a3 is used to open and close the current path from the first feed section 12b1 of the electromagnet 12 to the low voltage part (− side) of the field current supply source, and the fourth switching element 224a4 is used to open and close the current path from the second feed section 12b2 to the low voltage part of the field current supply source.

The first to fourth switching elements 224a1 to 224a4 of the polarity conversion circuit 224 are provided respectively with first to fourth freewheel diodes 224b1 to 224b4, each of which is connected in parallel. The current in the freewheel diodes flows in the opposite direction to the current flow in the switching elements 224a1 to 224a4.

Figure 5:
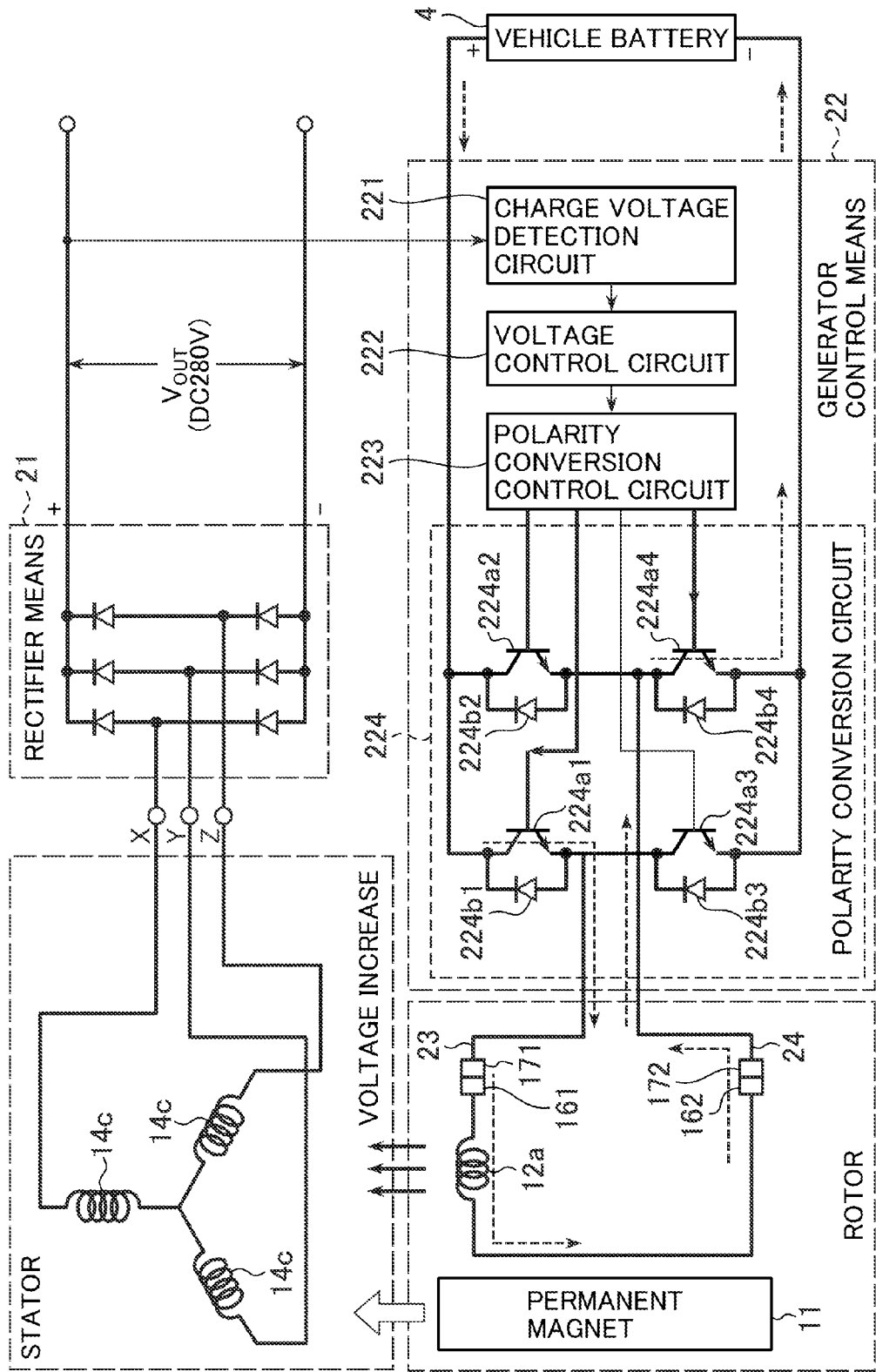
[FIG. 5] An explanatory diagram of the generator function unit operation during voltage increase control.

By simultaneously switching on the first switching element 224a1 and fourth switching element 224a4 of the polarity conversion circuit 224, the polarity conversion control circuit 223 that receives a voltage increase instruction from the voltage control circuit 222 is connected to the high voltage side by the first feeder line 23 and to the low voltage side by the second feeder line 24, supplying a forward current to the field coil 12a of the electromagnet 12 (see FIG. 5). This generates a magnetic field in the field coil 12a having the same orientation as the magnetic field of the permanent magnet 11, whereby voltage increase control is carried out.

Figure 6:
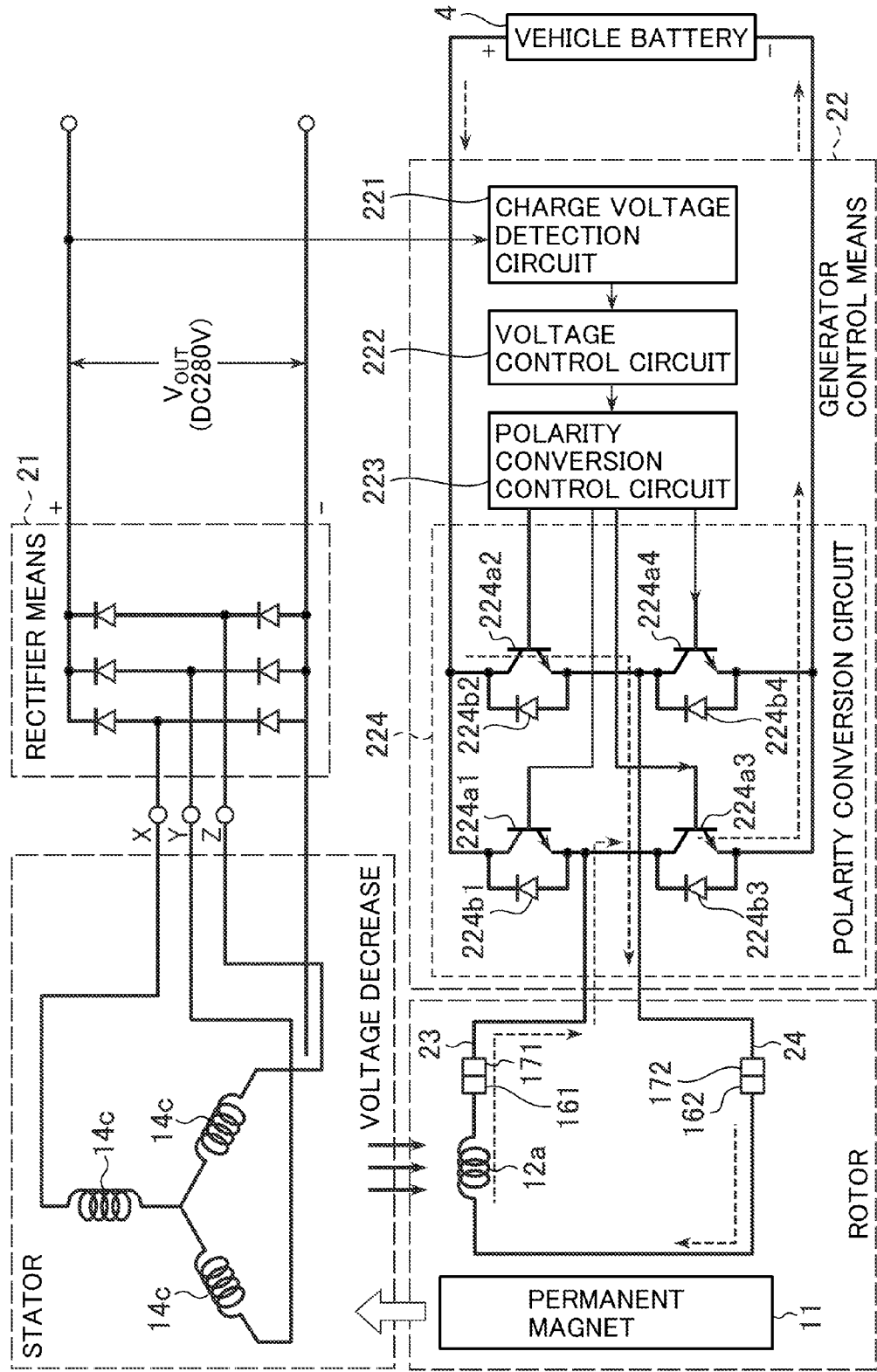
[FIG. 6] An explanatory diagram of the generator function unit operation during voltage decrease control.

By simultaneously switching on the second switching element 224a2 and the third switching element 224a3 of the polarity conversion circuit 224, the polarity conversion control circuit 223 that receives a voltage decrease instruction from the voltage control circuit 222 is connected to the low voltage side by the first feeder line 23 and to the high voltage side by the second feeder line 24, supplying a reverse current to the field coil 12a of the electromagnet 12 (see FIG. 6). This generates a magnetic field in the field coil 12a having the reverse orientation to the magnetic field of the permanent magnet 11, whereby voltage decrease control is carried out.

Figure 7:
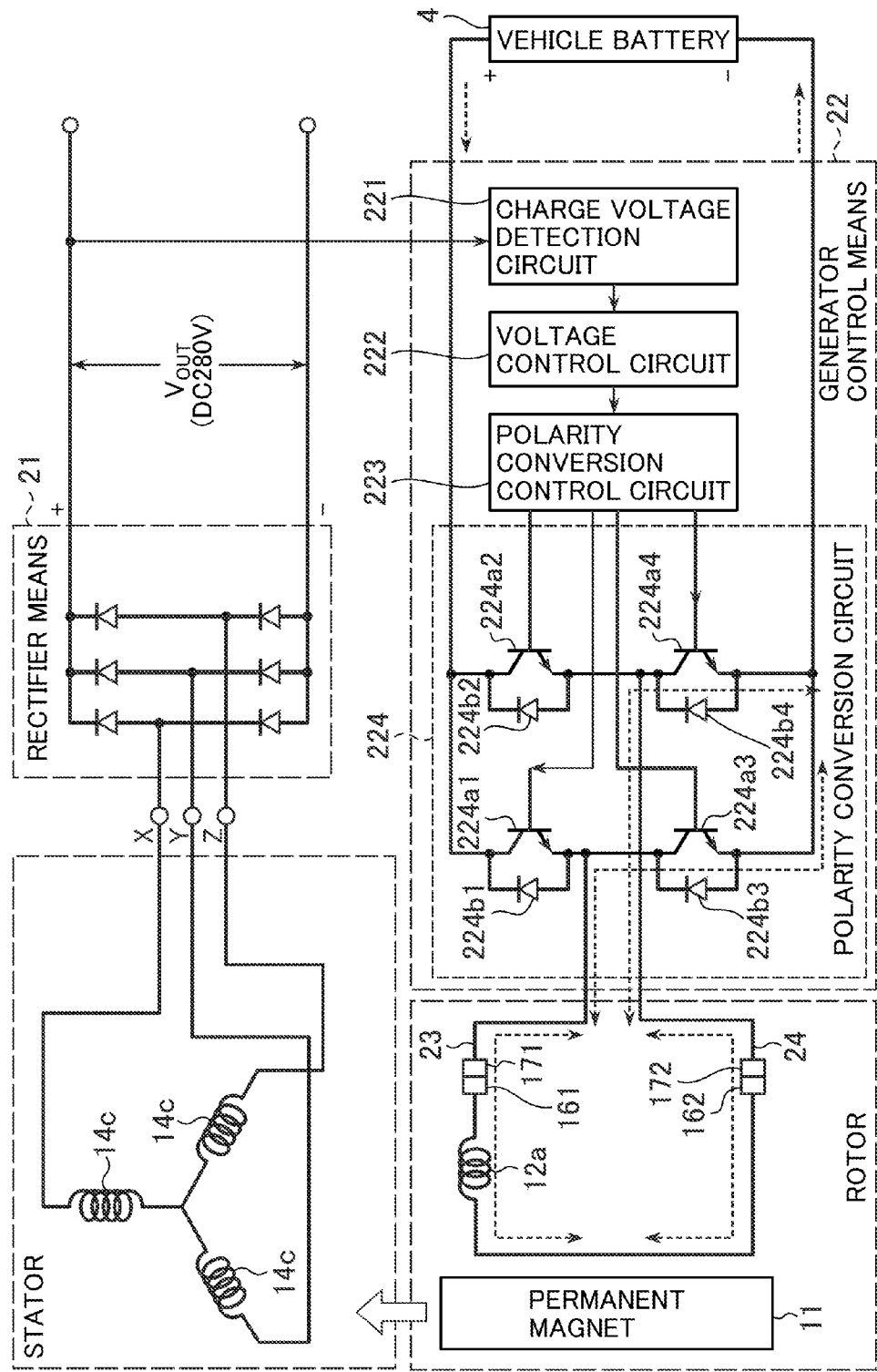
[FIG. 7] An explanatory diagram of the generator function unit when the field control is off.

As described in the foregoing, by controlling the on and off switching of the first to fourth switching elements 224a1 to 224a4 of the polarity conversion circuit, when the output voltage of the rectifier means 21 reaches a prescribed value, a stop instruction is output from the voltage control circuit 222 and received by the polarity conversion control circuit 223, and a closed loop that shorts the first feeder line 23 and second feeder line 24 is formed by simultaneously switching on, for example, third switching element 224a3 and fourth switching element 224a4 (see FIG. 7). That is, simultaneously switching on the third switching element 224a3 to which third freewheel diode 224b3 is connected in parallel and the fourth switching element 224a4 to which fourth freewheel diode 224b4 is connected in parallel stops the supply of electricity to the field coil 12a, forming a flywheel current return path, so the polarity conversion circuit 224 can be protected from the flywheel current without using high-pressure-resistant switching elements or special protection circuits.

A similar effect can be obtained by forming a flywheel current return path by simultaneously switching on the first switching element 224a1 to which first freewheel diode 224b1 is connected in parallel and the second switching element 224a2 to which second freewheel diode 224b2 is connected in parallel.

The generator function unit formed by the generator 10 as described above and generator control unit 20 uses the vehicle traction engine 2 as a driving source and also uses field current to control the output voltage obtained by utilizing the constant magnetic field of the permanent magnet, making it possible to obtain high power in a light, compact configuration. The generator control unit 20 of the generator function unit obtains charge data of the electric vehicle EV to be charged that is connected by feeder lines. Electric power can be supplied in which the charge voltage and charge current are maintained to form an appropriate charging environment in accordance with the charge data to charge the electric vehicle EV battery 41, enabling the battery to be quickly charged from the high-speed charge plug of the vehicle. Thus, it becomes possible for the rescue vehicle RC used to rescue and help electric vehicles with flat batteries to be made lighter and smaller. Mounting the battery charger 1 on board such a rescue vehicle would provide a practical rescue vehicle that can more easily traverse hilly terrain and narrow urban roads to reach stationary stranded electric vehicles. Moreover, the space saved by using the battery charger 1 having a smaller, lighter configuration would free up more room to equip the rescue vehicle with multiple functions, such as tire changing equipment, further increasing its utility.

During charging operations the battery 41 charge voltage and charge current are constantly monitored by the charge voltage monitor 34 and charge current monitor 35. If an abnormal condition arises in which a monitored value exceeds an upper-limit charge voltage or charge current predetermined as being an appropriate charging environment, the generator control unit 20 immediately stops feeding the electricity to the battery 41, preventing an accident that could damage the battery.

The generator control unit 20 is configured to pre-calculate the time required to sufficiently charge an electric vehicle and to have the charging timer 33 shut off the charging operation when said charging time has elapsed. So instead of letting the charging continue until the vehicle is fully charged, charging is brief, providing just enough of a charge to drive the vehicle to somewhere that is equipped with power supply equipment, such as a charge station.

Figure 8:
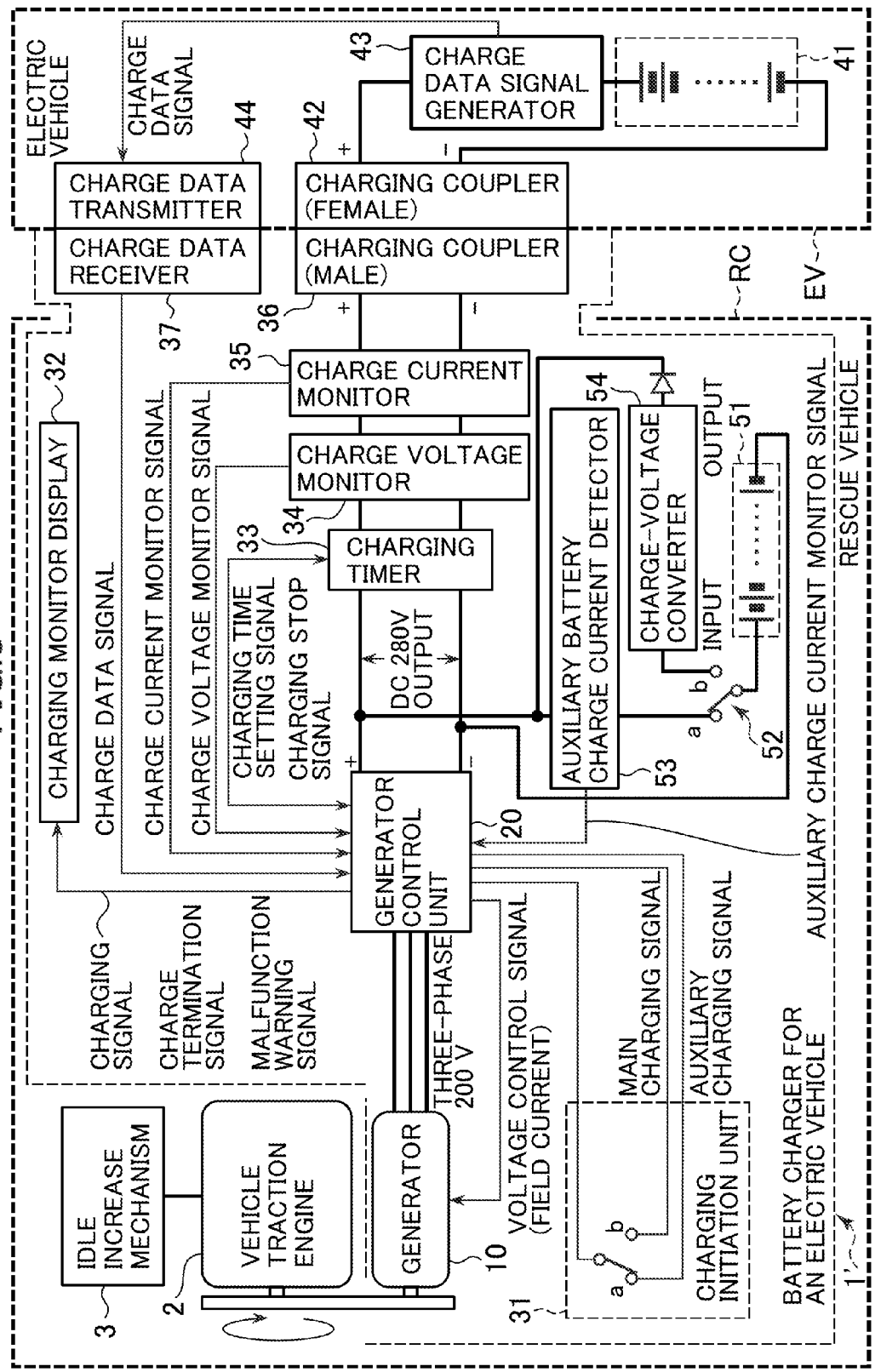
[FIG. 8] A block diagram schematically illustrating the battery charger for an electric vehicle mounted on a rescue vehicle, according to a second embodiment of the invention.

In the battery charger 1 according to the first embodiment described above, the rescue vehicle arrives at the place where the electric vehicle has stopped, connects the quick-charge plug, operates the generator function unit and generates the power for charging the electric vehicle battery 41. There is a limit to the power that can be generated by just the generator function unit, so providing an electricity storage capability that would help supplying the power for charging enables the rapid-charging time to be shortened. Thus the electric vehicle battery charger 1' according to the second embodiment shown in FIG. 8 is equipped with an auxiliary battery 51. While there is no particular limitation on the configuration of the auxiliary battery 51, in the example of this embodiment a battery equivalent (rated voltage of 200 V) to the electric vehicle battery 41 is used, enabling charging with the output (DC 280 V) from the generator control unit 20.

The charging initiation unit 31 of the auxiliary battery charger 1' can switch between a main charging mode for charging an electric vehicle, and an auxiliary charging mode for charging the auxiliary battery 51 (for example, always-on contact a is used to output an auxiliary charging signal, and contact b is used to output a main charging signal). During normal driving a discharge switch 52 is also connected to the always-on contact a for auxiliary charging of the auxiliary battery 51 installed in the electric vehicle battery charger 1', which applies the DC 280 V output of the generator to the auxiliary battery 51. The charge path to the auxiliary battery 51 is provided with an auxiliary battery charge current detector 53. When the generator control unit 20 receives an auxiliary charging current monitor signal from the detector 53, it controls the output of the generator 10 to maintain an appropriate charging environment to preclude the auxiliary battery 51 being damaged or its life shortened by the application of a high voltage or overcharging.

Meanwhile when the electric vehicle battery 41 in the electric vehicle battery charger is being charged, the charging initiation unit 31 of the battery charger 1' is switched to the main charging mode, causing the discharge switch 52 to switch to contact b, causing a discharge from the auxiliary battery 51 that is combined with the output from the generator control unit 20. Because the discharge voltage of the auxiliary battery 51 is lower than the output from the generator control unit 20, the output voltage is raised by a charge-voltage converter 54 to match the output voltage of the generator control unit 20.

Thus, the auxiliary battery 51 provided on-board with the battery charger 1' of the second embodiment can be charged by the power generated by the generator 10, so during charging of the electric vehicle, the outputs of the generator function unit and auxiliary battery 51 are combined to form a large power capacity having quick-charge capability.

Figure 9:
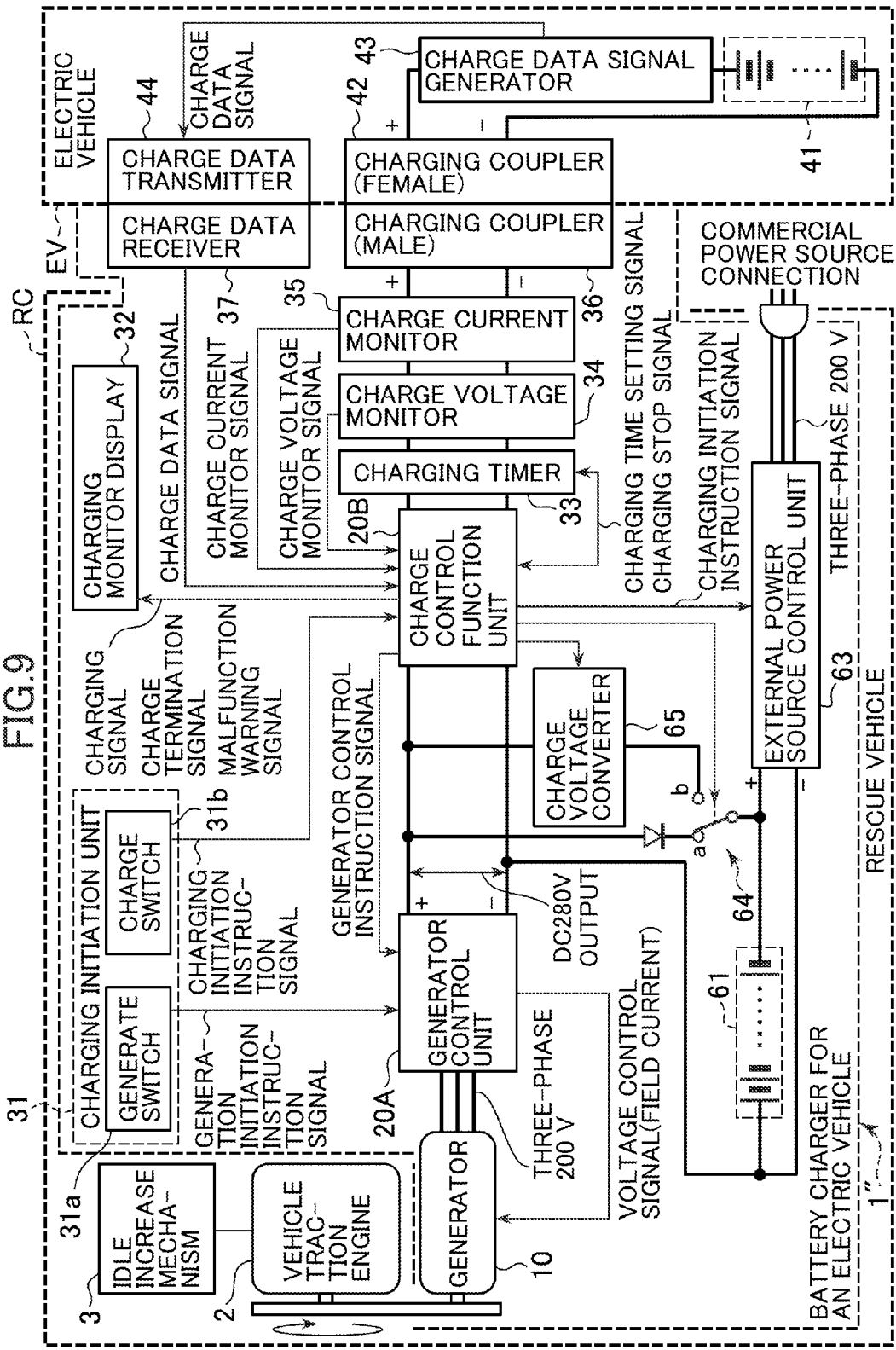
[FIG. 9] A block diagram schematically illustrating a rescue vehicle on which the battery charger for an electric vehicle is mounted, according to a third embodiment of the invention.

When the rescue vehicle is being driven, the auxiliary battery 51 is being charged by the battery charger 1 of the second embodiment. Operating the generator function unit while the rescue vehicle is being driven imposes a load on the vehicle traction engine 2 that has a slight effect on the fuel consumption of the rescue vehicle. With the electric vehicle battery charger 1" of the third embodiment shown in FIG. 9, an auxiliary battery 61 can be charged from an external commercial power source. While there is no particular limitation on the configuration of the auxiliary battery 61, in the example of this embodiment too, a battery equivalent (rated voltage of 200 V) to the electric vehicle battery 41 is used, enabling charging with the output (DC 280 V) from the generator control unit 20.

In the electric vehicle battery charger 1" the generator control unit 20 is divided into a generator control function unit 20A and a charge control function unit 20B. When a generate switch 31a of the charging initiation unit 31 is operated, a generation initiation instruction signal is input to the generator control function unit 20A whereby the generator 10 is driven by the unit 20A to obtain a DC 280 V output. When a charge switch 31b is operated, the generation initiation instruction signal is input to the charge control function unit 20B, enabling initiation of the main charging of the electric vehicle battery 41 and charging of the auxiliary battery 61. Providing the battery charger 1" with the separately configured units 20A and 20B, which are individually operative, enables charging of the auxiliary battery 61 from the external commercial power source to be controlled without operating the generator 10.

A power source plug 62 is provided for connecting an external commercial power source (three-phase, 200 V) for charging the auxiliary battery 61. The three-phase 200 V supplied via the plug 62 is converted to DC 280 V and output by an external power source control unit 63 and used to charge the auxiliary battery 61. If the external power source control unit 63 is configured as rectifier means in which diodes are connected in bridge, there is no particular need for an operating power source. However, in cases where fluctuations in the voltage of commercial AC are suppressed to achieve a constant voltage, the control unit 63 may be activated by the output of a generation initiation instruction signal from the charge control function unit 20B.

A charge/discharge switch 64 is used to switch between charging and discharging the auxiliary battery 61. For example, when the switch is on always-on contact a, it is connected to the generator control function unit 20A, which will be the case when charging from an external commercial source. However, as a rectifier means is provided on the feed path from the generator control function unit 20A, the auxiliary battery 61 can be charged from the external power source control unit 63 even when the generator control function unit 20A is not being operated.

When the generator control function unit 20B receives an instruction signal to initiate charging of the electric vehicle battery 41 (main charging signal), a generation initiation instruction signal is output from the generator control function unit 20B to the generator control function unit 20A, and the unit 20A controls the generation by the generator 10, producing DC 280 V for the charging. As the charging initiation control, under the control of the generator control function unit 20B the charge/discharge switch 64 is switched to the discharge path contact b, and a charge voltage converter 65 is operated to up-convert the discharge voltage from the auxiliary battery 61 and combine it with the generator output.

Thus, with the electric vehicle battery charger 1" according to the third embodiment, the auxiliary battery 61 can be charged from an external commercial power source and can therefore be charged at a desired time without operating the generator 10. This makes it possible to utilize cheap nighttime power to charge the auxiliary battery 61. In turn, this makes it possible effectively keep down the running cost of a rescue vehicle RC equipped with the electric vehicle battery charger 1".

In the foregoing embodiments of the battery charger for an electric vehicle and a rescue vehicle equipped with the battery charger have been described. However, the invention is not limited to these embodiments and can be worked by modifying the configuration thereof and converting known, existing technologies and means having an equal value, within the scope of the appended claims.

What is claimed is:

1. A battery charger for an electric vehicle provided with a generator function unit including a generator and a generator control unit;

the generator comprising;
    a rotor driven by a vehicle engine, on which a permanent magnet that generates a fixed magnetic field with a constant intensity and an electromagnet that generates a magnetic field with an intensity in accordance with a supply current are disposed so as not to interfere the two magnetic fields; and
    a stator fitted with stator coils, on which rotating magnetic fields generated by the permanent magnet and electromagnet of said rotor act simultaneously;

the generator control unit comprising;
    rectifier means that converts alternating current produced in the stator coils of the stator to direct current;
    generator voltage detection means that detects a voltage of a direct current rectified by said rectifier means, and
    generator control means, when a generator voltage detected by the generator voltage detection means is lower than a predetermined prescribed value, carrying out voltage increase control by supplying the electromagnet field coil with a forward current that produces in the electromagnet magnetic flux having a same orientation as magnetic flux of the permanent magnet, and stopping the forward current when the generator voltage detected by the generator voltage detection means reaches a default value, and when the generator voltage detected by the generator voltage detection means is higher than a predetermined prescribed value, carrying out voltage decrease control by supplying the electromagnet field coil with a reverse current that produces in the electromagnet magnetic flux having a reverse orientation to that of the magnetic flux of the permanent magnet, and stops the reverse current when the generator voltage detected by the generator voltage detection means reaches the default value; and the generator function unit being connected by feeder line to the electric vehicle to be charged for obtaining charge data and charging the electric vehicle battery by supplying electric power maintained at a charge voltage and charging current that form an appropriate charging environment in accordance with the charge data.

2. The battery charger for an electric vehicle according to claim 1, wherein the generator function unit constantly monitors charge voltage and charge current going to the electric vehicle battery during charging operations, and immediately stops supplying electricity to the battery if an abnormal condition arises in which a monitored value exceeds an upper-limit charge voltage or charge current predetermined as an appropriate charging environment.

3. The battery charger for an electric vehicle according to claim 1, wherein the generator control unit carries out a prior calculation of the time required to fully charge the electric vehicle and stops the charging operation when said time from charging operation initiation has elapsed.

4. The battery charger for an electric vehicle according to claim 1 that includes an auxiliary battery that can be charged using power generated by said generator.

5. The battery charger for an electric vehicle according to claim 4, wherein the auxiliary battery can be charged from an external commercial power supply.

6. A rescue vehicle equipped with the battery charger for an electric vehicle according to claim 1.

7. The battery charger for an electric vehicle according to claim 2, wherein the generator control unit carries out a prior calculation of the time required to fully charge the electric vehicle and stops the charging operation when said time from charging operation initiation has elapsed.

8. The battery charger for an electric vehicle according to claim 2 that includes an auxiliary battery that can be charged using power generated by said generator.

9. The battery charger for an electric vehicle according to claim 3 that includes an auxiliary battery that can be charged using power generated by said generator.

10. The battery charger for an electric vehicle according to claim 7 that includes an auxiliary battery that can be charged using power generated by said generator.

11. The battery charger for an electric vehicle according to claim 8, wherein the auxiliary battery can be charged from an external commercial power supply.

12. The battery charger for an electric vehicle according to claim 9, wherein the auxiliary battery can be charged from an external commercial power supply.

13. The battery charger for an electric vehicle according to claim 10, wherein the auxiliary battery can be charged from an external commercial power supply.

14. A rescue vehicle equipped with the battery charger for an electric vehicle according to claim 2.

15. A rescue vehicle equipped with the battery charger for an electric vehicle according to claim 3.

16. A rescue vehicle equipped with the battery charger for an electric vehicle according to claim 4.

17. A rescue vehicle equipped with the battery charger for an electric vehicle according to claim 5.

18. A rescue vehicle equipped with the battery charger for an electric vehicle according to claim 7.

19. A rescue vehicle equipped with the battery charger for an electric vehicle according to claim 8.

20. A rescue vehicle equipped with the battery charger for an electric vehicle according to claim 9.

* * * * *